US012260502B2

(12) United States Patent
Chhabra et al.

(10) Patent No.: US 12,260,502 B2
(45) Date of Patent: Mar. 25, 2025

(54) SYSTEM AND METHOD FOR SEARCHING POSITION OF A GEOGRAPHICAL DATA POINT IN THREE-DIMENSIONAL SPACE

(71) Applicant: CRON SYSTEMS PVT. LTD., New Delhi (IN)

(72) Inventors: Tushar Chhabra, New Delhi (IN); Saurav Agarwala, New Delhi (IN); Alankrit Mathur, New Delhi (IN)

(73) Assignee: CRON SYSTEMS PVT. LTD., New Delhi (IN)

( * ) Notice: Subject to any disclaimer, the term of this patent is extended or adjusted under 35 U.S.C. 154(b) by 113 days.

(21) Appl. No.: 18/085,142

(22) Filed: Dec. 20, 2022

(65) Prior Publication Data

US 2023/0127546 A1   Apr. 27, 2023

Related U.S. Application Data

(63) Continuation of application No. PCT/IB2021/055974, filed on Jul. 2, 2021.

(30) Foreign Application Priority Data

Jun. 29, 2020   (IN) .............................. 202011027506

(51) Int. Cl.
G06T 17/20      (2006.01)
G06T 7/73       (2017.01)

(52) U.S. Cl.
CPC ............. *G06T 17/20* (2013.01); *G06T 7/75* (2017.01)

(58) Field of Classification Search
CPC ......... G06T 17/20; G06T 17/00; G06T 17/10; G06T 17/005; G06T 7/75; G06T 17/05
See application file for complete search history.

(56) References Cited

U.S. PATENT DOCUMENTS 11,127,202 B2 *   9/2021   Krishna ................... G06T 7/579
11,200,353 B2 * 12/2021   Lachinski ............... G06F 16/29
(Continued)

FOREIGN PATENT DOCUMENTS

JP    2004272459 A    9/2004

OTHER PUBLICATIONS

International Search Report issued by the Indian Patent Office for International Patent Application No. PCT/IB2021/055974, mailed on Oct. 21, 2021.

*Primary Examiner* — Vijay Shankar
(74) *Attorney, Agent, or Firm* — Myers Wolin, LLC

(57) ABSTRACT

A system and method for mapping location of one or more target data points to a D-dimensional environment are provided. The method includes mapping a sorted array of D-dimensional polygons to a D-dimensional cartesian coordinate system, determining a floor value and a ceiling value of each coordinate point of each target data point, calculating one or more shifted floor value and one or more shifted ceiling value of each coordinate point, combining the shifted floor value and the shifted ceiling value for determining one or more potential centroids, authenticating the potential centroids for determining one or more real centroids by determining the presence of the potential centroid in the array, calculating the distance of the target data point from the real centroids, and determining the polygon having the real centroid with the least distance from the target data point.

9 Claims, 4 Drawing Sheets

(56) References Cited

U.S. PATENT DOCUMENTS

| | | |
|---|---|---|
| 2015/0062595 A1 | 3/2015 | Garcia et al. |
| 2019/0188906 A1* | 6/2019 | Krishna ............... G06V 10/762 |
| 2020/0202617 A1* | 6/2020 | Lachinski ............ H04N 13/204 |
| 2023/0351690 A1* | 11/2023 | Gorman ................ G06T 3/4038 |

* cited by examiner

SYSTEM AND METHOD FOR SEARCHING POSITION OF A GEOGRAPHICAL DATA POINT IN THREE-DIMENSIONAL SPACE

CROSS-REFERENCE TO RELATED APPLICATIONS

This application is a continuation of International Patent Application No. PCT/IB2021/055974, filed Jul. 2, 2021, which claims priority from Indian Patent Application No. 202011027506, filed Jun. 29, 2020, and these applications are incorporated herein by reference for all purposes as if fully set forth herein.

FIELD OF THE INVENTION

Embodiments of the present invention generally relate to systems and methods for determining the location of a geographical data point in a three-dimensional space. Particularly, the present invention describes a time optimised technique for mapping geographical data points in a three-dimensional space scanned by three-dimensional sensors.

BACKGROUND OF THE INVENTION

The subject matter discussed in the background section should not be assumed to be prior art merely as a result of it being mentioned in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

Three-dimensional scanning is a technology widely used for analysing real-world objects, buildings, landscapes and providing situational awareness and vision to machines for automation. 3D scanning enables collecting data regarding the depth, position, shape and appearance that could be either further analysed or accurate digital 3D models could be constructed.

Three-dimensional (3D) scanning may be enabled by means of technologies such as Laser Triangulation, Structured Light, Time of Flight, and the like. Devices such as Light Detection And Ranging (LIDAR), Laser Detection And Ranging (LADAR), Light-emitting diode detection and ranging (LeDDAR), Radio Detection and Ranging (RaDAR) and Depth Sensing Cameras like Microsoft Kinect or Intel RealSense scanners are commonly used for 3D scanning. LIDAR, LADAR and LEDDAR in general is used for measuring distances (ranging) by illuminating the target with laser light and measuring the reflection with a sensor. Similarly RaDAR in general is used for measuring distances (ranging) by illuminating the target with Radio Waves in C, K or mmWave Bands. Time of flight of laser/light or radio wave 30 returns and the return wavelengths and the intensities of the returns can then be used to make digital 3-D representations of the target. LIDAR/RaDAR or Depth Measuring Cameras provide an output of 3D point clouds producing highly accurate x, y, z measurements of reflections and their intensities. 3D point clouds can be used for a number of applications, such as rendering appealing visual effect based on the physical properties of 3D structures and cleaning of raw input 3D point clouds e.g., by removing moving objects (car, bike, person). Other 3D object detection, classification and recognition industry domains include agriculture, astronomy, atmosphere, Autonomous Vehicles, Biology and conservation, Forestry, Geology and soil science, Law enforcement, Mining, Image Recognition, Surveying, robotics, intelligent vehicle systems, augmented reality, transportation maps and geological surveys where high resolution digital elevation maps help in detecting subtle topographic features. Some of the major application of 3D point cloud and sensing are to create a 3D representation of a terrain's surface, 3D imaging for healthcare, smart devices, topographic analysis and prediction of soil properties in agricultural landscapes, categories crops based on their characteristics and find the best places to plant them, mapping the surfaces of celestial bodies, guidance system for autonomous vehicles, and the like.

It is essential to map the 3D data points received from a scanning device such as a LIDAR to the three-dimensional space before the 3D point cloud could be of any uses. A typical LIDAR could have a data rate of 50 million points from an average 16 beam LiDAR and hence time of processing is vital. Similarly processing power or computing power is vital as usually the processing takes place on an embedded device and therefore the power or processing requirements cannot be stretched beyond a limit.

Mapping such large number of 3D data points to the three-dimensional space can consume a lot of time and computing power. Moreover, increase if the range of the three-dimensional space and the granularity of such space to be mapped increases the time complexity as well as the required computing power. Therefore, there exists a need in the art for a time and computing power optimized system and methods for mapping or detecting a geographical data point to the corresponding geographical space.

OBJECT OF THE INVENTION

An object of the present invention is to provide a system and a method for mapping, searching, or locating a 3D data point in a three-dimensional space.

Another object of the present invention is to provide a system and a method that enables a time and computing power optimized solution for mapping, searching, or locating a 3D data point in a three-dimensional space.

Another object of the present invention is to provide a system and a method that enables mapping, searching, or locating a 3D data point in a three-dimensional space without increasing the time complexity with the increase in the range of the scanned three-dimensional space.

Yet another object of the present invention is to provide a system and a method that enables mapping, searching, or locating a 3D data point in a three-dimensional space without increasing the time complexity with the increase in the granularity of the scan.

SUMMARY OF THE INVENTION

Now there has been invented an improved method and technical equipment implementing the method, by which the above problems are at least alleviated. Various aspects of the invention include a method, system and a computer program, which are characterized by what is stated in the independent claims. Various embodiments of the invention are disclosed in the dependent claims.

In accordance with an embodiment of the present invention, a method for mapping location of one or more target data points to a D-dimensional environment is described. The method comprising the steps of obtaining a D-dimensional point-cloud data of the D-dimensional environment from one or more sensing units, the D-dimensional point-cloud data containing location information of each data point of the D-dimensional environment. In an aspect, the one or more sensing units are selected from a group comprising of a LIDAR system, a Ladar, a Leddar, a Radar, and a depth sensing camera.

Thereafter a sorted array of a plurality of D-dimensional polygons is obtained, each D-dimensional polygon having a centroid, wherein the sorted array of the plurality of D-dimensional polygons represents the D-dimensional environment.

Then, mapping the sorted array of the plurality of D-dimensional polygons to a cartesian coordinate system. Determining a floor value and a ceiling value of each coordinate point of each target data point. Calculating one or more shifted floor value and one or more shifted ceiling value of each coordinate point of each target data point. In an aspect, the one or more shifted floor value and one or more shifted ceiling value is calculated by shifting the floor value and ceiling value of each coordinate point by a corresponding shift size along x axis and a corresponding shift size along y axis and a corresponding shift along z axis. In another aspect, the one or more shifted ceiling value is calculated by shifting the ceiling value of each coordinate point by a ceiling shift size.

Combining the one or more shifted floor value and the one or more shifted ceiling value for determining one or more potential centroids. Authenticating the one or more potential centroids for determining one or more real centroids by determining the presence of the one or more potential centroid in the array of centroids. Calculating the distance of the target data point from the one or more real centroids; and determining the polygon having the real centroid with the least distance from the target data point.

In another embodiment, a system for mapping location of one or more target data points in a three-dimensional environment is described. The system comprises one or more sensing units, at least one memory unit, and a processing unit. The one or more sensing units are configured for obtaining a D-dimensional point-cloud data of the D-dimensional environment from one or more sensing units, the D-dimensional point-cloud data containing location information of each data point of the D-dimensional environment. In an aspect, the one or more sensing units are selected from a group comprising of a LIDAR system, a Ladar, a Leddar, a Radar, and a depth sensing camera.

The memory unit may be configured for storing a plurality of instructions, and a D-dimensional point-cloud representation of the D-dimensional environment, the D-dimensional point-cloud representation containing location information of each data point of the D-dimensional environment. The processing unit coupled with a memory may be configured for obtaining a sorted array of a plurality of D-dimensional polygons, each D-dimensional polygon having a centroid, wherein the sorted array of the plurality of D-dimensional polygons represents the D-dimensional environment.

The processing unit may be communicatively coupled with the memory. The processing unit may execute the plurality of instructions for mapping the sorted array of the plurality of D-dimensional polygons to a cartesian coordinate system; converting the D-dimensional point-cloud data into a sorted array of a plurality of D-dimensional polygons, wherein each D-dimensional polygon has a centroid; calculating a floor value and a ceiling value of each coordinate point of each target data point; calculating one or more shifted floor value and one or more shifted ceiling value of each coordinate point of each target data point; combining the one or more shifted floor value and the one or more shifted ceiling value for determining one or more potential centroids; authenticating the one or more potential centroids for determining one or more real centroids by determining the presence of the one or more potential centroid in the array of centroids; calculating the distance of the target data point from the one or more real centroids; and determining the polygon having the real centroid with the least distance from the target data point.

BRIEF DESCRIPTION OF THE DRAWINGS

So that the manner in which the above recited features of the present invention can be understood in detail, a more particular to the description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, the invention may admit to other equally effective embodiments. These and other features, benefits and advantages of the present invention will become apparent by reference to the following text figure, with like reference numbers referring to like structures across the views, wherein.

DETAILED DESCRIPTION OF DRAWINGS

Figure 1:
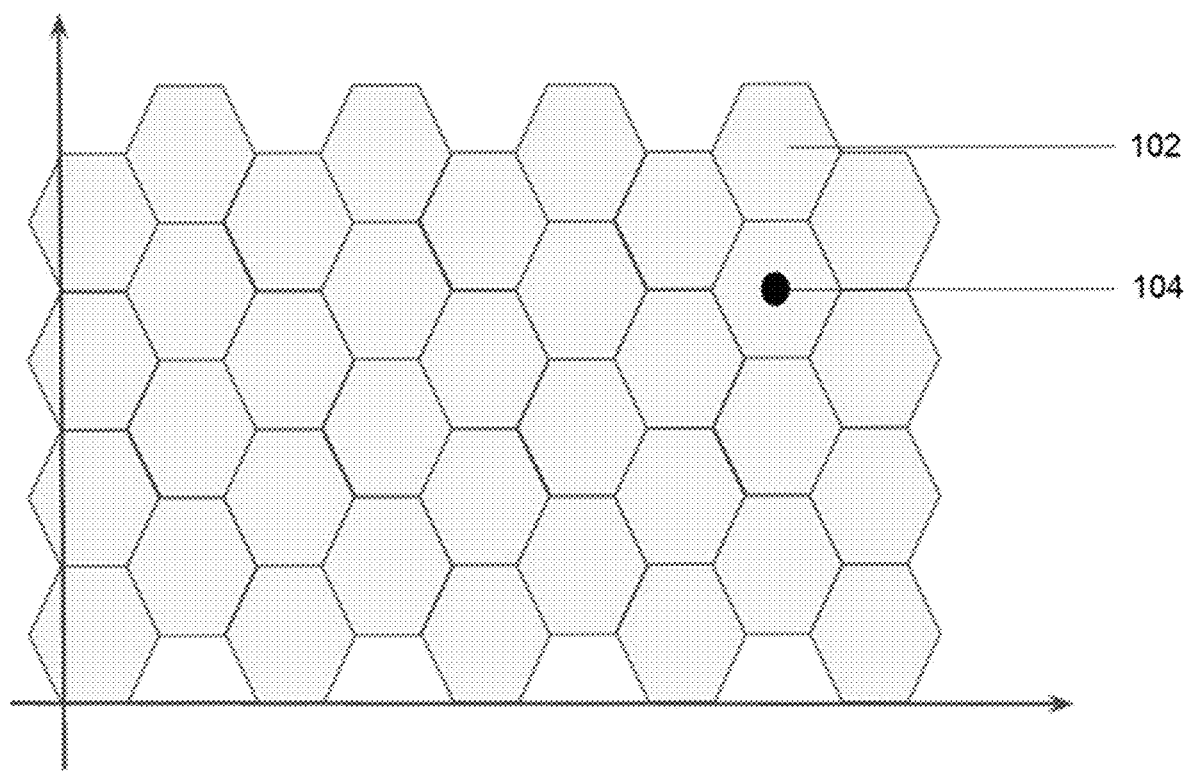
FIG. 1 illustrates a sorted array of polygons with a centroid, according to an embodiment of the present invention.

While the present invention is described herein by way of example using embodiments and illustrative drawings, those skilled in the art will recognize that the invention is not limited to the embodiments of drawing or drawings described and are not intended to represent the scale of the various components. Further, some components that may form a part of the invention may not be illustrated in certain figures, for ease of illustration, and such omissions do not limit the embodiments outlined in any way. It should be understood that the drawings and detailed description thereto are not intended to limit the invention to the particular form disclosed, but on the contrary, the invention is to cover all modifications, equivalents, and alternatives falling within the scope of the present invention as defined by the appended claims. As used throughout this description, the word "may" is used in a permissive sense (i.e. meaning having the potential to), rather than the mandatory sense, (i.e. meaning must). Further, the words "a" or "an" mean "at least one" and 25 the word "plurality" means "one or more" unless otherwise mentioned. Furthermore, the terminology and phraseology used herein is solely used for descriptive purposes and should not be construed as limiting in scope. Language such as "including," "comprising," "having," "containing," or "involving," and variations thereof, is intended to be broad and encompass the subject matter listed thereafter, equivalents, and 30 additional subject matter not recited, and is not intended to exclude other additives, components, integers or steps. Likewise, the term "comprising" is considered synonymous with the terms "including" or "containing" for applicable legal purposes. Any discussion of documents, acts, materials, devices, articles and the like is included in the specification solely for the purpose of providing a context for the present invention. It is not suggested or represented that any or all of these matters form part of the prior art base or were common general knowledge in the field relevant to the present invention.

In this disclosure, whenever a composition or an element or a group of elements is preceded with the transitional phrase "comprising", it is understood that we also contemplate the same composition, element or group of elements with transitional phrases "consisting of", "consisting", "selected from the group of consisting of, "including", or "is" preceding the recitation of the composition, element or group of elements and vice versa.

The present invention is described hereinafter by various embodiments with reference to the accompanying drawings, wherein reference numerals used in the accompanying drawing correspond to the like elements throughout the description. This invention may, however, be embodied in many different forms and should not be construed as limited to the embodiment set forth herein. Rather, the embodiment is provided so that this disclosure will be thorough and complete and will fully convey the scope of the invention to those skilled in the art. In the following detailed description, numeric values and ranges are provided for various aspects of the implementations described. These values and ranges are to be treated as examples only and are not intended to limit the scope of the claims. In addition, a number of materials are identified as suitable for various facets of the implementations. These materials are to be treated as exemplary and are not intended to limit the scope of the invention.

In accordance with an embodiment of the present invention, a scanning device scans a d-dimensional space and provides a point cloud data. Such point cloud data comprises of information related to a plurality of points present in the d-dimensional space. In an aspect, the point cloud data may include location information such as (x, y, z) coordinates of each point present in the d-dimensional space. Apart from the (x, y, z) coordinates the point cloud may also provide information regarding color, intensity, and luminosity of each point present in the d-dimensional space. The scanning device along with an associated processing unit may convert the point cloud into an interlocked grid of a plurality of regular polygons. These polygons may have d-dimensions based on the information captured by the scanning device. Each such polygon may comprise of a plurality of data points present in the d-dimensional space. Each such polygon has a centroid.

In FIG. 1 a sorted array of polygons with a centroid is illustrated according to an embodiment of the present invention. The figure illustrates a 2-dimensional array of polygons, however, a person skilled in the art would appreciate that dimensions of polygons depend on the dimensions of the scanned environment. For example, if a 2D drawing is scanned then the polygons would have 2-dimensions. In another example, if a three-dimensional environment such as a road with vehicles is scanned then the polygons would have 3-dimensions. For ease of understanding the interlocked grid of polygons represented in FIG. 1 are 2-dimensional. Polygon (102) is a regular hexagon with a centroid (104). Polygon (102) may comprise a plurality of data points depending on the cluster of points present in the point cloud provided by the scanning device. The present invention provides methods, systems, devices, and computer program for mapping these plurality of data points to such polygons. Upon mapping the data points to polygons further processing is enabled for further analytics such as object recognition.

Figure 2:
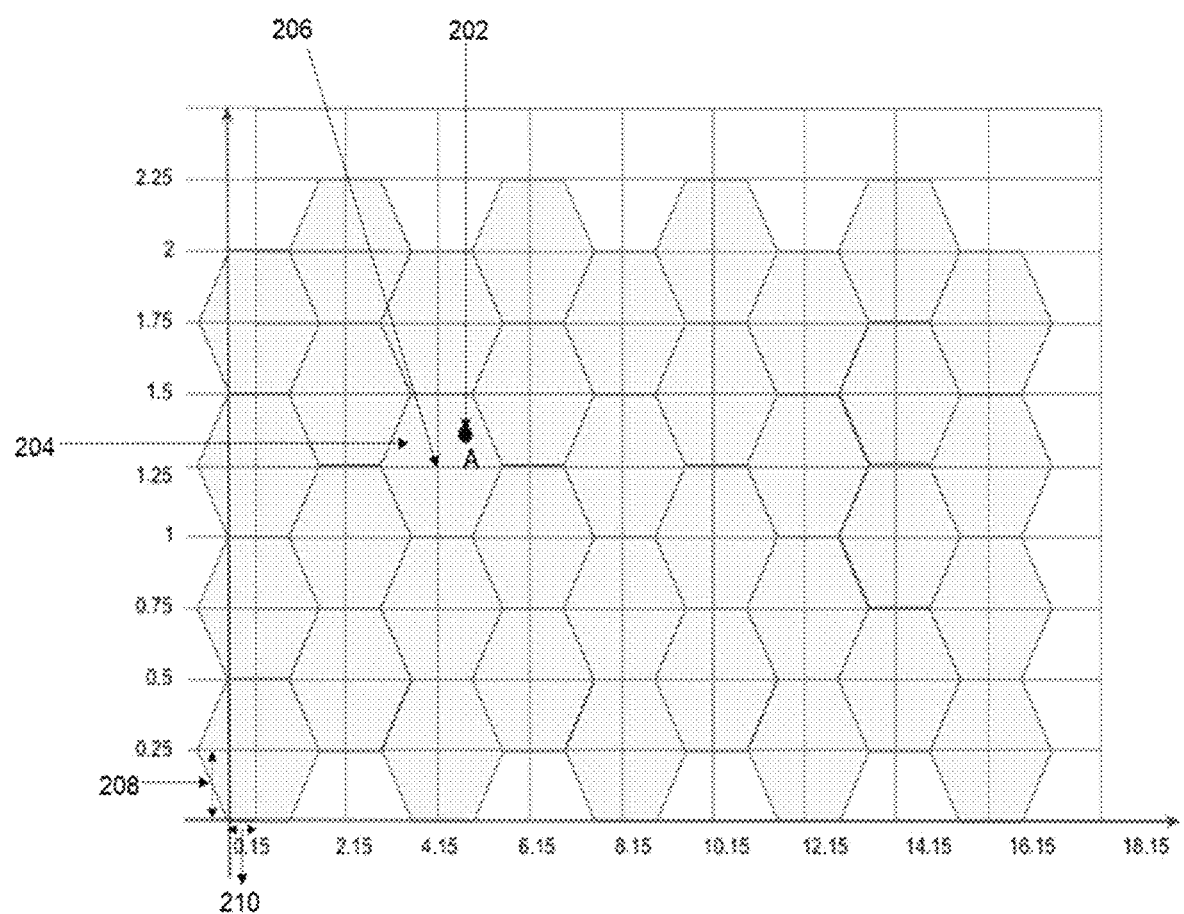
FIG. 2 illustrates a sorted array of polygons mapped to a cartesian coordinate system, according to an embodiment of the present invention.

The interlocked grid of D-dimensional polygons are then mapped to a cartesian coordinate system having D-dimensions. FIG. 2 illustrates a sorted array of polygons mapped to a cartesian coordinate system, according to an embodiment of the present invention. For ease of understanding a 2-dimensional coordinate system is illustrated and mapped to 2-dimensional polygons. A target data point A (202) is illustrated in the figure having coordinates (x,y). For example, the target data point A (202) has coordinates (4.25, 1.35), where abscissa is equal to 4.25 and ordinate is equal to 1.35. The polygon (204) having the centroid (206) may contain the target data point A (202) which will be determined in accordance to the method described in FIG. 3. It should be noted that the sorted array of polygons or sorted array of centroids is interchangeably used throughout the present disclosure.

Further, upon mapping the array of regular polygons may result into the bottom-left vertex of a first polygon to be mapped with (X=0, Y=0). This may result into an offset between the coordinate system and the array of centroids of the regular polygons. A shift size is determined along the x axis and the y axis based on the distance of the centroid of the first polygon from (X=0, Y=0).

Figure 3:
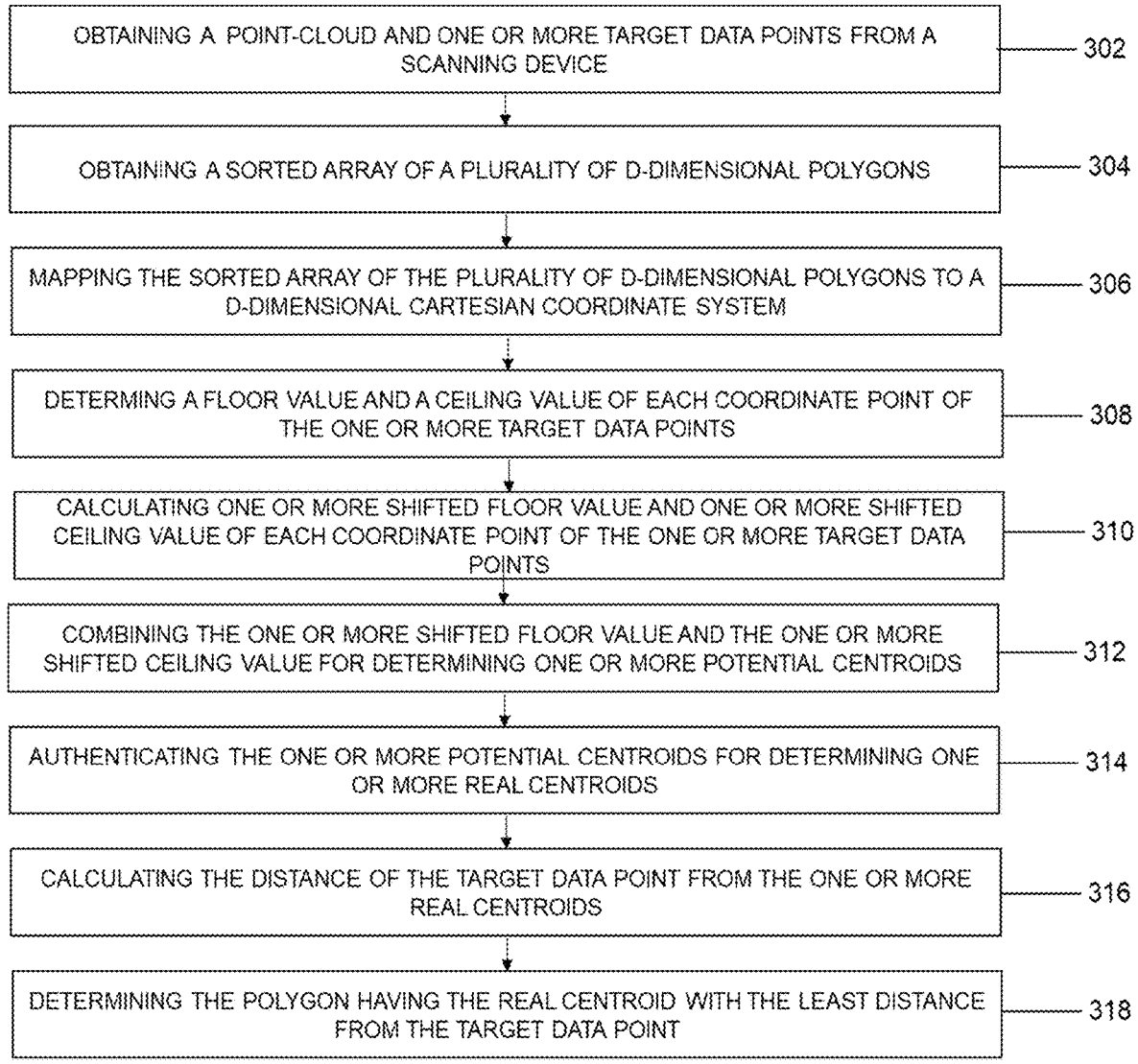
FIG. 3 illustrates a method for mapping one or more target data points to a d-dimensional environment, according to an embodiment of the present invention.

FIG. 3 illustrates a method for mapping one or more target data points to a d-dimensional environment, according to an embodiment of the present invention. At step 302, D-dimensional point-cloud data of the D-dimensional environment is obtained from one or more sensing units or scanning devices. The D-dimensional point-cloud data contains location information of each data point of the D-dimensional environment. At step 304, the D-dimensional point-cloud data may be converted into a sorted array of a plurality of D-dimensional polygons, wherein each D-dimensional polygon has a centroid. Alternatively, the processor coupled with the memory may create a sorted array of a plurality of D-dimensional polygons.

Then at step 306, the plurality of centroids of the D-dimensional polygons is mapped to a D-dimensional cartesian coordinate system. For example, if the polygons are a three-dimensional polygon, then a three-dimensional cartesian coordinate system is used for mapping.

At step 308, a floor value and a ceiling value of each coordinate point of each target data point is calculated. Here, floor and ceiling values of the abscissa and the ordinate value of the target data point are determined. For example, the target data point A (202) has coordinates (4.25, 1.35), hence the floor value of abscissa of point A would be 4 and the ceiling value of abscissa of point A would be 5. Similarly, the floor value of ordinate of point A would be 1 and the ceiling value of ordinate of point A would be 2.

At step 310, shifted floor value and shifted ceiling value of each coordinate point of the target data point is calculated. In an aspect, the shift size is by calculating the distance of the centroid of the first polygon from (X=0, Y=0) along the x axis and the y axis. For example, for the target data point A (202) the shift size along the x axis would be 0.15 and the shift size along the y axis would be 0.25. Therefore, the shifted floor and ceiling values for target data point A (202) would be ((X1=4.15, X2=5.15), (Y1=1.25, Y2=2.25)).

Now at step 312, the shifted floor and ceiling values of the abscissa and ordinate of the target data point A (202) are combined to determine one or more potential centroids. For example, if the shifted floor and ceiling values for target data point A (202) are ((X1=4.15, X2=5.15), (Y1=1.25, Y2=2.25)) then the potential centroids would be (X1, Y1), (X2, Y2), (X1, Y2), (X2, Y1) resulting in the potential centroids as (4.15, 1.25), (5.15, 2.25), (4.15, 2.25), (5.15, 1.25).

At step 314, the potential centroids are authenticated for determining one or more real centroids by determining the presence of the one or more potential centroid in the array of centroids. A real centroid would be present as a centroid of a single polygon in the sorted array of polygons. For the present example, only (4.15, 1.25) and (4.15, 2.25) are present as a centroid in the sorted array of polygons. Hence, these 2 points are stored as real centroids.

Now for determining the polygon is which the target data point A (202) is present, at step 316 distance is calculated between the target data point from the real centroids. For the present example, distance between the target data point A (202) having coordinates (4.25, 1.35) is calculated from determined real centroids (4.15, 1.25) and (4.15, 2.25). At step 318, it is clearly seen that the target data point A (202) is closest to centroid (4.15, 1.25) in comparison to (4.15, 2.25), hence the polygon having (4.15, 1.25) as centroid is the polygon containing the target data point A.

The steps as disclosed above are either iteratively or in parallel can be executed for mapping all the data points to the polygons of the d-dimensional space.

Figure 4:
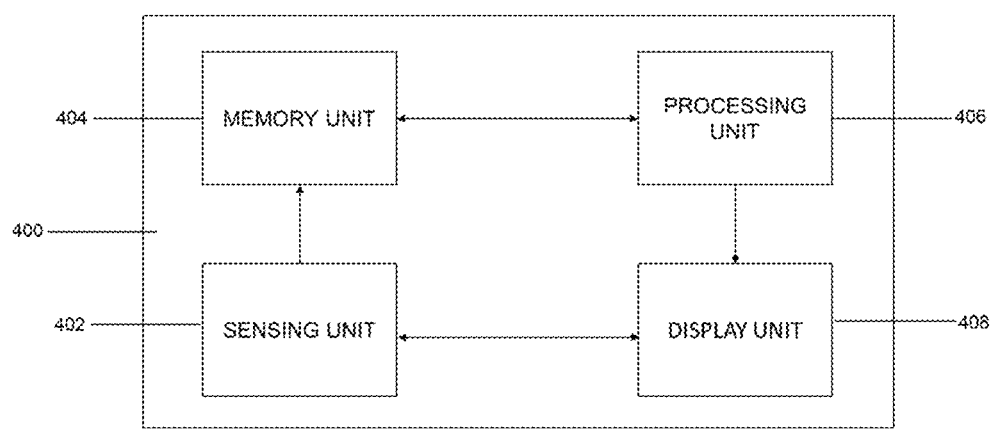
FIG. 4 illustrates a system for mapping one or more target data points to a d10 dimensional environment, according to an embodiment of the present invention.

FIG. 4 illustrates a system (400) for mapping one or more target data points to a d-dimensional environment, according to an embodiment of the present invention.

It should be note that the system could be implemented as an embedded system or a distributed system. For example, the memory unit (404) and one or more sensing unit (402) could be present in a separate device and at different location from the processing unit (406) and display unit (408) which could be implemented in a server-side computing device. In another example, the system (400) may be an autonomous vehicle or a self-driving car.

In principle the one or more sensing units (402) scan the d-dimensional space and the data collected is stored in memory unit (404). The stored data is then retrieved from the memory unit (404) by the processing unit (406) for executing the method steps as described in FIG. 3. The processing unit (406) and the scanning module (402) may further be connected to the display unit (408) for displaying the scanned images and for further analysis. In an aspect, the processing unit (406) may be a parallel processing unit.

The one or more sensing units (402) are configured for obtaining a D-dimensional point-cloud data of the D-dimensional environment from one or more sensing units, the D-dimensional point-cloud data containing location information of each data point of the D-dimensional environment. In an aspect, the one or more sensing units are selected from a group comprising of a LIDAR system, a Ladar, a Leddar, a Radar, and a depth sensing camera.

The memory unit (404) may be configured for storing a plurality of instructions, and a D-dimensional point-cloud representation of the D-dimensional environment, the D-dimensional point-cloud representation containing location information of each data point of the D-dimensional environment.

The processing unit (406) may be communicatively coupled with the memory. The processing unit may execute the plurality of instructions for mapping the sorted array of the plurality of D-dimensional polygons to a cartesian coordinate system; converting the D-dimensional point-cloud data into a sorted array of a plurality of D-dimensional polygons, wherein each D-dimensional polygon has a centroid; calculating a floor value and a ceiling value of each coordinate point of each target data point; calculating one or more shifted floor value and one or more shifted ceiling value of each coordinate point of each target data point; combining the one or more shifted floor value and the one or more shifted ceiling value for determining one or more potential centroids; authenticating the one or more potential centroids for determining one or more real centroids by determining the presence of the one or more potential centroid in the array of centroids; calculating the distance of the target data point from the one or more real centroids; and determining the polygon having the real centroid with the least distance from the target data point.

In another embodiment, a computer program product for causing a computer to map location of one or more target data points to a D-dimensional environment is disclosed. The computer program product may be stored in a computer memory, the computer memory being coupled to one or more central processing units, graphics processing units or accelerated processing units.

The computer program product may be embodied for example as a storage device carrying instructions or a signal carrying instructions, comprising instructions for programming a programmable processing apparatus to become operable to perform a method as set out above or to become configured as an apparatus as set out above. In an aspect, the apparatus may be an apparatus related to agriculture, astronomy, atmosphere, Autonomous Vehicles, Biology and conservation, Forestry, Geology and soil science, Law enforcement, Mining, 3D imaging for healthcare, Image Recognition, Surveying, robotics, intelligent vehicle systems, augmented reality, transportation maps and geological surveys where high resolution digital elevation maps help in detecting subtle topographic features.

The computer program product when executed by the processing units cause obtaining a D-dimensional point-cloud data of the D-dimensional environment and one or more target data points from one or more sensing units, the D-dimensional point-cloud data containing location information of each data point of the D-dimensional environment. Obtaining a sorted array of a plurality of D-dimensional polygons, each D-dimensional polygon having a centroid, wherein the sorted array of the plurality of D-dimensional polygons represents the D-dimensional environment. Mapping the sorted array of the plurality of D-dimensional polygons to a D-dimensional cartesian coordinate system. Determining a floor value and a ceiling value of each coordinate point of each target data point. Calculating one or more shifted floor value and one or more shifted ceiling value of each coordinate point of each target data point. Combining the one or more shifted floor value and the one or more shifted ceiling value for determining one or more potential centroids. Authenticating the one or more potential centroids for determining one or more real centroids by determining the presence of the one or more potential centroid in the array of centroids. Calculating the distance of the target data point from the one or more real centroids; and determining the polygon having the real centroid with the least distance from the target data point.

In another embodiment, a non-transitory computer-readable media having stored thereon instructions, which when executed by one or more processors, cause one or more processors to map location of one or more target data points to a D-dimensional environment. The non-transitory computer-readable media enable obtaining a D-dimensional point-cloud data of the D-dimensional environment and one or more target data points from one or more sensing units, the D-dimensional point-cloud data containing location information of each data point of the D-dimensional environment. Obtaining a sorted array of a plurality of D-dimensional polygons, each D-dimensional polygon having a centroid, wherein the sorted array of the plurality of D-dimensional polygons represents the D-dimensional environment. Mapping the sorted array of the plurality of D-dimensional polygons to a D-dimensional cartesian coordinate system. Determining a floor value and a ceiling value of each coordinate point of each target data point. Calculating one or more shifted floor value and one or more shifted ceiling value of each coordinate point of each target data point. Combining the one or more shifted floor value and the one or more shifted ceiling value for determining one or more potential centroids.

Authenticating the one or more potential centroids for determining one or more real centroids by determining the presence of the one or more potential centroid in the array of centroids. Calculating the distance of the target data point from the one or more real centroids; and determining the polygon having the real centroid with the least distance from the target data point.

In another embodiment of the invention a programmable processing apparatus is disclosed, such as a personal computer (PC), containing, in a conventional manner, one or more processors, memories, graphics cards etc. together with a display device, such as a conventional personal computer monitor, and user input devices, such as a keyboard, mouse etc. The programmable processing apparatus is programmed to operate in accordance with programming instructions input, for example, as data stored on a data storage medium (such as an optical CD ROM, semiconductor ROM, magnetic recording medium, eta), and/or as a signal (for example an electrical or optical signal input to the processing apparatus, for example from a remote database, by transmission over a communication network (not shown) such as the Internet or by transmission through the atmosphere), and/or entered by a user via a user input device such as a keyboard. The programmable processing apparatus may enable obtaining a D-dimensional point-cloud data of the D-dimensional environment and one or more target data points from one or more sensing units, the D-dimensional point-cloud data containing location information of each data point of the D-dimensional environment. Obtaining a sorted array of a plurality of D-dimensional polygons, each D-dimensional polygon having a centroid, wherein the sorted array of the plurality of D-dimensional polygons represents the D-dimensional environment. Mapping the sorted array of the plurality of D-dimensional polygons to a D-dimensional cartesian coordinate system. Determining a floor value and a ceiling value of each coordinate point of each target data point. Calculating one or more shifted floor value and one or more shifted ceiling value of each coordinate point of each target data point. Combining the one or more shifted floor value and the one or more shifted ceiling value for determining one or more potential centroids. Authenticating the one or more potential centroids for determining one or more real centroids by determining the presence of the one or more potential centroid in the array of centroids. Calculating the distance of the target data point from the one or more real centroids; and determining the polygon having the real centroid with the least distance from the target data point.

The present invention offers a number of advantages. Firstly, the present invention provides a simple, cost-effective and easy to use solution for the problems of prior art. The existing technology that relies on brute force method of mapping/searching target data point in the polygons in three-dimensional space is computationally expensive as all the polygons need to be searched for the target data point. On the other hand, with the present invention the time of processing or the time complexity as well as the computational requirements remain constant irrespective of the increase in the granularity or the range of the scanner as for a three-dimensional space only 9 valid polygons ($3^3$) need to be calculated for nearest centroid. This does not change even if the number of polygons increase in the 3D space.

In general, the word "module" as used herein, refers to logic embodied in hardware or firmware, or to a collection of software instructions, written in a programming language, such as, for example, Java, C, Python or assembly. One or more software instructions in the modules may be embedded in firmware, such as an EPROM. It will be appreciated that modules may comprised connected logic units, such as gates and flip-flops, and may comprise programmable units, such as programmable gate arrays or processors. The modules described herein may be implemented as either software and/or hardware modules and may be stored in any type of computer-readable medium or other computer storage device.

Further, while one or more operations have been described as being performed by or otherwise related to certain modules, devices or entities, the operations may be performed by or otherwise related to any module, device or entity. As such, any function or operation that has been described as being performed by a module could alternatively be performed by a different server, by the cloud computing platform, or a combination thereof. It should be understood that the techniques of the present disclosure might be implemented using a variety of technologies. For example, the methods described herein may be implemented by a series of computer executable instructions residing on a suitable computer readable medium. Suitable computer readable media may include volatile (e.g., RAM) and/or non-volatile (e.g., ROM, disk) memory, carrier waves and transmission media. Exemplary carrier waves may take the form of electrical, electromagnetic or optical signals conveying digital data steams along a local network or a publicly accessible network such as the Internet.

It should also be understood that, unless specifically stated otherwise as apparent from the following discussion, it is appreciated that throughout the description, discussions utilizing terms such as "controlling" or "obtaining" or "computing" or "storing" or "receiving" or "determining" or the like, refer to the action and processes of a computer system, or similar electronic computing device, that processes and transforms data represented as physical (electronic) quantities within the computer system's registers and memories into other data similarly represented as physical quantities within the computer system memories or registers or other such information storage, transmission or display devices.

Various modifications to these embodiments are apparent to those skilled in the art from the description and the accompanying drawings. The principles associated with the various embodiments described herein may be applied to other embodiments. Therefore, the description is not intended to be limited to the embodiments shown along with the accompanying drawings but is to be providing broadest scope of consistent with the principles and the novel and inventive features disclosed or suggested herein. Accordingly, the invention is anticipated to hold on to all other such alternatives, modifications, and variations that fall within the scope of the present invention and the appended claims.

We claim:

1. A processor implemented method for mapping location of one or more target data points to a D-dimensional environment, the method comprising the step of:
   obtaining a D-dimensional point-cloud data of the D-dimensional environment and one or more target data points from one or more sensing units, the D-dimensional point-cloud data containing location information of each data point of the D-dimensional environment;
   obtaining a sorted array of a plurality of D-dimensional polygons, each D-dimensional polygon having a centroid, wherein the sorted array of the plurality of D-dimensional polygons represents the D-dimensional environment;
   mapping the sorted array of the plurality of D-dimensional polygons to a D-dimensional cartesian coordinate system;
   determining a floor value and a ceiling value of each coordinate point of each target data point; calculating one or more shifted floor value and one or more shifted ceiling value of each coordinate point of each target data point;
   combining the one or more shifted floor value and the one or more shifted ceiling value for determining one or more potential centroids;
   authenticating the one or more potential centroids for determining one or more real centroids by determining the presence of the one or more potential centroid in the array of centroids; calculating the distance of the target data point from the one or more real centroids; and
   determining the polygon having the real centroid with the least distance from the target data point.

2. The method as claimed in claim 1, where the one or more sensing units are selected from a group comprising of a LIDAR system, a Ladar, a Leddar, a Radar, and a depth sensing camera.

3. The method as claimed in claim 1, wherein the one or more shifted floor value and one or more shifted ceiling value is calculated by shifting the floor value and ceiling value of each coordinate point by a corresponding shift size along x axis, a corresponding shift size along y axis, and a corresponding shift size along z axis.

4. The method as claimed in claim 1, wherein the one or more shifted floor value is calculated by shifting the floor value of each coordinate point by a floor shift size.

5. The method as claimed in claim 1, wherein the one or more shifted ceiling value is calculated by shifting the ceiling value of each coordinate point by a ceiling shift size.

6. A system for mapping location of one or more target data points in a three-dimensional environment, the system comprising:
   one or more sensing units for obtaining a D-dimensional point-cloud data of the D-dimensional environment from one or more sensing units, the D-dimensional point-cloud data containing location information of each data point of the D-dimensional environment;
   obtaining a sorted array of a plurality of D-dimensional polygons, each D-dimensional polygon having a centroid, wherein the sorted array of the plurality of D-dimensional polygons represents the D-dimensional environment;
   a memory unit for storing a plurality of instructions, and a D-dimensional point-cloud representation of the D-dimensional environment, the D-dimensional point-cloud representation containing location information of each data point of the D-dimensional environment;
   a processing unit communicatively coupled with the memory unit, wherein the processing unit executes the plurality of instructions for:
   mapping the sorted array of the plurality of D-dimensional polygons to a D-dimensional cartesian coordinate system;
   determining a floor value and a ceiling value of each coordinate point of each target data point;
   calculating one or more shifted floor value and one or more shifted ceiling value of each coordinate point of each target data point;
   combining the one or more shifted floor value and the one or more shifted ceiling value for determining one or more potential centroids; authenticating the one or more potential centroids for determining one or more real centroids by determining the presence of the one or more potential centroid in the array of centroids;
   calculating the distance of the target data point from the one or more real centroids; and determining the polygon having the real centroid with the least distance from the target data point.

7. The system as claimed in claim 6, wherein the one or more sensing units are selected from a group comprising of a LIDAR system, a Ladar, a Leddar, a Radar, and a depth sensing camera.

8. A computer program product comprising a non-transitory computer useable medium having computer program logic for enabling at least one processor to map location of one or more target data points in a three-dimensional environment, said 20 computer logic comprising:
   obtaining a D-dimensional point-cloud data of the D-dimensional environment and one or more target data points from one or more sensing units, the D-dimensional point-cloud data containing location information of each data point of the D-dimensional environment;
   obtaining a sorted array of a plurality of D-dimensional polygons, each D-dimensional polygon having a centroid, wherein the sorted array of the plurality of D-dimensional polygons represents the D-dimensional environment; mapping the sorted array of the plurality of D-dimensional polygons to a D-dimensional cartesian coordinate system;
   determining a floor value and a ceiling value of each coordinate point of each target data point;
   calculating one or more shifted floor value and one or more shifted ceiling value of each coordinate point of each target data point;
   combining the one or more shifted floor value and the one or more shifted ceiling value for determining one or more potential centroids;
   authenticating the one or more potential centroids for determining one or more real centroids by determining the presence of the one or more potential centroid in the array of centroids;
   calculating the distance of the target data point from the one or more real centroids; and
   determining the polygon having the real centroid with the least distance from the target data point.

9. An apparatus comprising one or more sensing unit, a memory unit, and a processing unit, wherein the sensing unit, the memory unit, and the processing unit are communicatively coupled for performing the steps of:
   obtaining a D-dimensional point-cloud data of the D-dimensional environment and one or more target data points from one or more sensing units, the D-dimensional point-cloud data containing location information of each data point of the D-dimensional environment;

obtaining a sorted array of a plurality of D-dimensional polygons, each D-dimensional polygon having a centroid, wherein the sorted array of the plurality of D-dimensional polygons represents the D-dimensional environment; mapping the sorted array of the plurality of D-dimensional polygons to a D-dimensional cartesian coordinate system;

determining a floor value and a ceiling value of each coordinate point of each target data point; calculating one or more shifted floor value and one or more shifted ceiling value of each coordinate point of each target data point; combining the one or more shifted floor value and the one or more shifted ceiling value for determining one or more potential centroids;

authenticating the one or more potential centroids for determining one or more real centroids by determining the presence of the one or more potential centroid in the array of centroids;

calculating the distance of the target data point from the one or more real centroids; and determining the polygon having the real centroid with the least distance from the target data point.

* * * * *